United States Patent
Anderson et al.

(10) Patent No.: US 11,649,056 B2
(45) Date of Patent: May 16, 2023

(54) THERMALLY ISOLATED SENSOR FOR GAS TURBINE ENGINE

(71) Applicant: HONEYWELL INTERNATIONAL INC., Morris Plains, NJ (US)

(72) Inventors: Morris Anderson, Mesa, AZ (US); Peter Anthony, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 346 days.

(21) Appl. No.: 16/904,295

(22) Filed: Jun. 17, 2020

(65) Prior Publication Data
US 2021/0394913 A1    Dec. 23, 2021

(51) Int. Cl.
| | |
|---|---|
| *G01K 7/00* | (2006.01) |
| *B64D 15/04* | (2006.01) |
| *G01K 13/02* | (2021.01) |
| *G01L 19/00* | (2006.01) |
| G01K 13/024 | (2021.01) |

(52) U.S. Cl.
CPC ............ *B64D 15/04* (2013.01); *G01K 7/00* (2013.01); *G01K 13/02* (2013.01); *G01L 19/0092* (2013.01); *G01K 13/024* (2021.01)

(58) Field of Classification Search
CPC .... G01K 13/02; G01K 13/024; G01K 13/028; G01K 7/00; G01K 13/00; G01K 17/00; G01K 2205/00
See application file for complete search history.

(56) References Cited

U.S. PATENT DOCUMENTS

| | | | |
|---|---|---|---|
| 3,512,414 A * | 5/1970 | Rees | ............ G01K 13/02 416/61 |
| 6,076,963 A | 6/2000 | Menzies et al. | |
| 8,517,604 B2 | 8/2013 | Parsons | |
| 8,734,108 B1 * | 5/2014 | Liang | ............ F01D 5/189 416/96 A |

(Continued)

FOREIGN PATENT DOCUMENTS

| | | | | |
|---|---|---|---|---|
| CN | 108981964 A | * | 12/2018 | ............ G01K 1/14 |
| CN | 109115371 A | * | 1/2019 | ............ F01D 21/003 |

(Continued)

OTHER PUBLICATIONS

Agui, Juan H., et al. "Total Temperature Measurements in Icing Cloud Flows Using a Rearward Facing Probe," downloaded from https://ntrs.nasa.gov/search.jsp?R=20190027071 2020-03-04T09:16:54+00:00Z on Apr. 3, 2020.

*Primary Examiner* — Gail Kaplan Verbitsky
(74) *Attorney, Agent, or Firm* — Lorenz & Kopf, LLP

(57) ABSTRACT

A thermally isolated sensor associated with a gas turbine engine includes a sensor probe configured to measure a temperature of a fluid associated with the gas turbine engine, and a base to be coupled to the gas turbine engine. The thermally isolated sensor includes a leading projection coupled to the base that extends into the fluid. The leading projection is configured to be heated by a heat source associated with the gas turbine engine. The thermally isolated sensor includes a trailing projection coupled to the base that extends into the fluid. The trailing projection is downstream from the leading projection. The trailing projection includes an inlet, and the sensor probe is disposed within the inlet and thermally isolated from the leading projection.

16 Claims, 8 Drawing Sheets

(56) References Cited

U.S. PATENT DOCUMENTS

| | | | |
|---|---|---|---|
| 9,631,985 B2 | 4/2017 | Herman | |
| 9,970,824 B2 | 5/2018 | Cheung et al. | |
| 10,151,641 B2 | 12/2018 | Herman et al. | |
| 10,337,931 B2 | 7/2019 | Anderson et al. | |
| 10,401,229 B2 | 9/2019 | Anderson et al. | |
| 10,436,649 B2 | 10/2019 | Anderson et al. | |
| 2004/0177683 A1* | 9/2004 | Ice | G01K 13/02 374/E13.006 |
| 2004/0261518 A1* | 12/2004 | Seidel | B64D 43/02 73/182 |
| 2007/0199384 A1* | 8/2007 | Kuznar | F02C 7/047 374/E13.006 |
| 2007/0220984 A1* | 9/2007 | Slagle | G01P 5/16 374/E13.006 |
| 2010/0236251 A1* | 9/2010 | Hein | F23N 5/14 60/806 |
| 2013/0235897 A1* | 9/2013 | Bouteyre | G01M 99/002 374/4 |
| 2013/0315283 A1* | 11/2013 | Parsons | G01K 13/028 374/208 |
| 2014/0254631 A1* | 9/2014 | Slavens | G01K 13/02 73/431 |
| 2015/0063414 A1* | 3/2015 | Wigen | G01K 13/028 374/138 |
| 2015/0103863 A1* | 4/2015 | Herman | G01K 13/028 374/138 |
| 2016/0231199 A1* | 8/2016 | Miller | F02C 3/04 |
| 2016/0376010 A1* | 12/2016 | Gmach | B64D 15/04 244/134 B |
| 2017/0228881 A1* | 8/2017 | Zakrzewski | B64D 37/00 |
| 2018/0313698 A1* | 11/2018 | Anderson | G01K 1/20 |
| 2021/0270144 A1* | 9/2021 | Holl | G01K 1/14 |

FOREIGN PATENT DOCUMENTS

| | | | | |
|---|---|---|---|---|
| EP | 2853872 A1 * | 4/2015 | | F01D 21/003 |
| EP | 3112832 A1 | 1/2017 | | |
| EP | 3872467 A1 * | 9/2021 | | F01D 21/003 |
| GB | 2435521 A * | 8/2007 | | F01D 17/06 |
| WO | WO-2008068075 A1 * | 6/2008 | | B22C 7/026 |
| WO | WO-2014143264 A1 * | 9/2014 | | F01D 17/085 |

\* cited by examiner

THERMALLY ISOLATED SENSOR FOR GAS TURBINE ENGINE

TECHNICAL FIELD

The present disclosure generally relates to gas turbine engines, and more particularly relates to a thermally isolated sensor for use with a gas turbine engine.

BACKGROUND

Gas turbine engines may be employed to power various devices. For example, a gas turbine engine may be employed to power a mobile platform, such as an aircraft. Generally, gas turbine engines are controlled based on ambient operating conditions surrounding the gas turbine engine during use. For example, a total temperature or a total pressure of the air surrounding the gas turbine engine may be used to control the gas turbine engine. In certain instances, the air surrounding the gas turbine engine during operation may be below freezing, such that ice or ice droplets may form on a sensor, causing the sensor to provide an erroneous total temperature or total pressure reading.

Accordingly, it is desirable to provide a sensor for a gas turbine engine, in which the sensor is thermally isolated to improve accuracy. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a thermally isolated sensor associated with a gas turbine engine. The thermally isolated sensor includes a sensor probe configured to measure a temperature of a fluid associated with the gas turbine engine, and a base to be coupled to the gas turbine engine. The thermally isolated sensor includes a leading projection coupled to the base that extends into the fluid. The leading projection is configured to be heated by a heat source associated with the gas turbine engine. The thermally isolated sensor includes a trailing projection coupled to the base that extends into the fluid. The trailing projection is downstream from the leading projection. The trailing projection includes an inlet, and the sensor probe is disposed within the inlet and thermally isolated from the leading projection.

The fluid is air, and the leading projection and the trailing projection are scarfed at an angle to inhibit droplets or particles entrained in the fluid from entering the inlet of the trailing projection. The leading projection further comprises a first conduit fluidly coupled to the heat source. The leading projection includes a second inlet configured to receive the fluid, and the second inlet is fluidly coupled to a second sensor configured to measure a pressure of the fluid. The second inlet is fluidly coupled to a second conduit defined in the leading projection, and the second conduit is fluidly coupled to the second sensor and to a drain. The heat source associated with the gas turbine engine is bleed air from a compressor section associated with the gas turbine engine. The trailing projection defines a fourth conduit fluidly coupled to the inlet, and the fourth conduit surrounds the sensor probe. The trailing projection defines a fifth conduit fluidly coupled to the fourth conduit to receive the fluid and fluidly coupled to the leading projection. The fifth conduit includes an ejector nozzle, and defines an ejector outlet to exhaust the fluid out of the thermally isolated sensor.

Also provided is a thermally isolated sensor associated with a gas turbine engine. The thermally isolated sensor includes a sensor probe configured to measure a temperature of a fluid associated with the gas turbine engine, and a base to be coupled to the gas turbine engine. The thermally isolated sensor includes a leading projection coupled to the base that extends into the fluid. The leading projection includes a first conduit configured to receive a hot fluid associated with the gas turbine engine. The thermally isolated sensor includes a trailing projection coupled to the base that extends into the fluid. The trailing projection is downstream from the leading projection. The trailing projection includes an inlet and an ejector conduit, and the sensor probe is disposed within the inlet and thermally isolated from the leading projection. The ejector conduit is fluidly coupled to the first conduit and configured to exhaust the hot fluid and the fluid from the thermally isolated sensor.

The fluid is air, and a leading end of the leading projection and a trailing end of the trailing projection extend at an angle relative to a longitudinal axis of the thermally isolated sensor to inhibit droplets or particles entrained in the fluid from entering the inlet of the trailing projection. The leading projection includes a second inlet configured to receive the fluid, and the second inlet is fluidly coupled to a second sensor configured to measure a pressure of the fluid. The second inlet is fluidly coupled to a second conduit defined in the leading projection, and the second conduit is fluidly coupled to the second sensor and to a drain. The hot fluid is bleed air from a compressor section associated with the gas turbine engine. The trailing projection defines a fourth conduit fluidly coupled to the inlet, and the fourth conduit surrounds the sensor probe. The ejector conduit is fluidly coupled to the fourth conduit to receive the fluid and fluidly coupled to the first conduit to receive the hot fluid. The ejector conduit includes an ejector nozzle configured to receive the hot fluid from the first conduit.

Further provided is a gas turbine engine. The gas turbine engine includes a hot fluid source configured to supply a hot fluid, and a thermally isolated sensor configured to measure a temperature and a pressure of an ambient fluid surrounding the gas turbine engine. The thermally isolated sensor includes a temperature probe, and a pressure inlet configured to direct a portion of the ambient fluid to a pressure sensor. The thermally isolated sensor includes a base coupled to the gas turbine engine, and a leading projection coupled to the base that extends into the ambient fluid. The leading projection includes a first conduit configured to receive the hot fluid and a second conduit. The second conduit is fluidly coupled to the pressure inlet to receive the ambient fluid and to the pressure sensor. The thermally isolated sensor includes a trailing projection coupled to the base that extends into the ambient fluid. The trailing projection is downstream from the leading projection, and the trailing projection includes an inlet and an ejector conduit. The temperature probe is disposed within the inlet and thermally isolated from the leading projection, and the ejector conduit is fluidly coupled to the first conduit and configured to exhaust the hot fluid and the ambient fluid from the thermally isolated sensor.

The trailing projection defines a fourth conduit fluidly coupled to the inlet, the fourth conduit surrounds the temperature probe and the ejector conduit is fluidly coupled to the fourth conduit to receive the ambient fluid. The ambient fluid is air, and a leading end of the leading projection and a trailing end of the trailing projection extend at an angle relative to a longitudinal axis of the thermally isolated sensor to inhibit droplets or particles entrained in the fluid from entering the inlet of the trailing projection.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
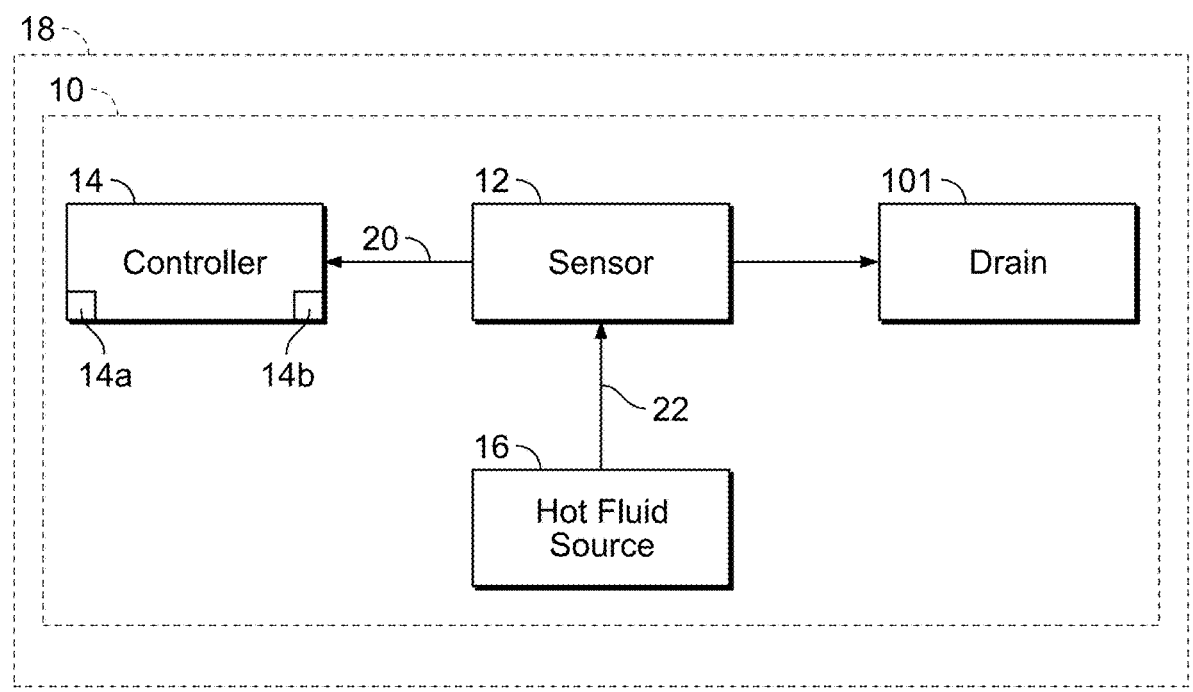
FIG. 1 is a functional block diagram of a gas turbine engine, which includes a thermally isolated sensor in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from having a thermally isolated sensor to improve accuracy, and the gas turbine engine described herein is merely one exemplary embodiment according to the present disclosure. In addition, while the thermally isolated sensor is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "transverse" denotes an axis that crosses another axis at an angle such that the axis and the other axis are neither substantially perpendicular nor substantially parallel.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the thermally isolated sensor described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

With reference to FIG. 1, FIG. 1 is a functional block diagram of a gas turbine engine 10, which includes a thermally isolated sensor 12. As will be discussed, the thermally isolated sensor 12 observes at least one characteristic associated with an ambient environment surrounding the thermally isolated sensor 12, and generates sensor signals based thereon. By providing a thermally isolated sensor 12, the accuracy of the readings or observations of the thermally isolated sensor 12 is improved, while a likelihood of ice accumulating on the thermally isolated sensor 12 is reduced. In this example, the thermally isolated sensor 12 is used with a gas turbine engine 10, however, the thermally isolated sensor 12 may be employed with any suitable device. In one example, the thermally isolated sensor 12 is in communication with a controller 14 and a hot fluid source 16 each associated with the gas turbine engine 10.

In one example, the gas turbine engine 10 is a turboprop gas turbine engine within an aircraft 18, although other arrangements and uses may be provided. For example, the gas turbine engine 10 may be a non-propulsive engine, such as an Auxiliary Power Unit (APU) deployed onboard the aircraft 18. In other embodiments, the gas turbine engine 10 may assume the form of an industrial power generator. In certain embodiments, the gas turbine engine is a turbofan gas turbine engine. Thus, as the gas turbine engine 10 may be any suitable gas turbine engine for use with the thermally isolated sensor 12, the gas turbine engine 10 will not be discussed in great detail herein.

Briefly, the gas turbine engine 10 includes an intake section, a compressor section, a combustor section, a turbine section, and an exhaust section. The intake section includes an inlet duct for receiving air from a source, such as a source external to the aircraft 18. The compressor section includes at least one compressor, which is coupled to a shaft. The rotation of the shaft drives the compressor, which draws in air from the inlet duct of the intake section. The compressor raises the pressure of the air and directs majority of the high pressure air into the combustor section. As will be discussed, in one example, a portion of the air compressed by the compressor section is bled off, and comprises the hot fluid source 16 for the thermally isolated sensor 12. In one example, the combustor section includes a combustor, which receives the compressed air from the compressor, and also receives a flow of fuel. The fuel and compressed air are mixed within the combustor, and are combusted to produce relatively high-energy combustion gas. The relatively high-energy combustion gas that is generated in the combustor is supplied to the turbine section. The turbine section includes a turbine. However, it will be appreciated that the number of turbines, and/or the configurations thereof, may vary. In this example, the high-temperature combusted air from the combustor section expands through and rotates the turbine. The air is then exhausted through the exhaust section. As the turbine rotates, it drives equipment, such as a propeller associated with the aircraft 18 and systems in the gas turbine engine 10 via a shaft or spool, and optionally, one or more gear sets.

In one example, the controller 14 is an engine controller associated with the gas turbine engine 10, such as a full authority digital engine (or electronics) control (FADEC). The controller 14 includes at least one processor 14a and a computer readable storage device or media 14b. The processor 14a can be any custom made or commercially available processor, a central processing unit (CPU), an auxiliary processor among several processors associated with the controller 14, a semiconductor based microprocessor (in the form of a microchip or chip set), a macroprocessor, any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 14 in controlling components associated with the gas turbine engine 10.

The instructions may include one or more separate programs, each of which comprises an ordered listing of executable instructions for implementing logical functions. The instructions, when executed by the processor, receive and process input signals from the thermally isolated sensor 12, perform logic, calculations, methods and/or algorithms for controlling the components of the gas turbine engine 10, and generate signals to components of the gas turbine engine 10 based on the logic, calculations, methods, and/or algorithms. Although only one controller 14 is shown, embodiments of the gas turbine engine 10 can include any number of controllers that communicate over any suitable communication medium or a combination of communication mediums and that cooperate to process the signals from the thermally isolated sensor 12, perform logic, calculations, methods, and/or algorithms, and generate control signals to control features of the gas turbine engine 10.

In various embodiments, one or more instructions of the controller 14, when executed by the processor, receive and process signals from the thermally isolated sensor 12 to determine a total temperature of ambient air surrounding the gas turbine engine 10. The one or more instructions of the controller 14, when executed by the processor, also receive and process signals from the thermally isolated sensor 12 to determine a total pressure of the ambient air surrounding the gas turbine engine 10. The thermally isolated sensor 12 is in communication with the controller 14 over a suitable communication medium or architecture 20, such as a bus.

The hot fluid source 16 is fluidly coupled to the thermally isolated sensor 12. The hot fluid source 16 supplies the thermally isolated sensor 12 with a hot fluid 22, such as heated air. In one example, the hot fluid source 16 is the gas turbine engine 10. In this example, the hot fluid source 16 comprises bleed air from the compressor section of the gas turbine engine 10, which is coupled via suitable conduits to the thermally isolated sensor 12. In one example, the hot fluid 22 has a temperature of about 200 degrees Fahrenheit (F) to about 700 degrees Fahrenheit (F), which is greater than a temperature of the ambient air surrounding the gas turbine engine 10. As will be discussed, the thermally isolated sensor 12 is heated by the hot fluid 22, which inhibits a formation of ice or ice particles on the thermally isolated sensor 12 without interfering with the accuracy of the thermally isolated sensor 12.

Figure 2:
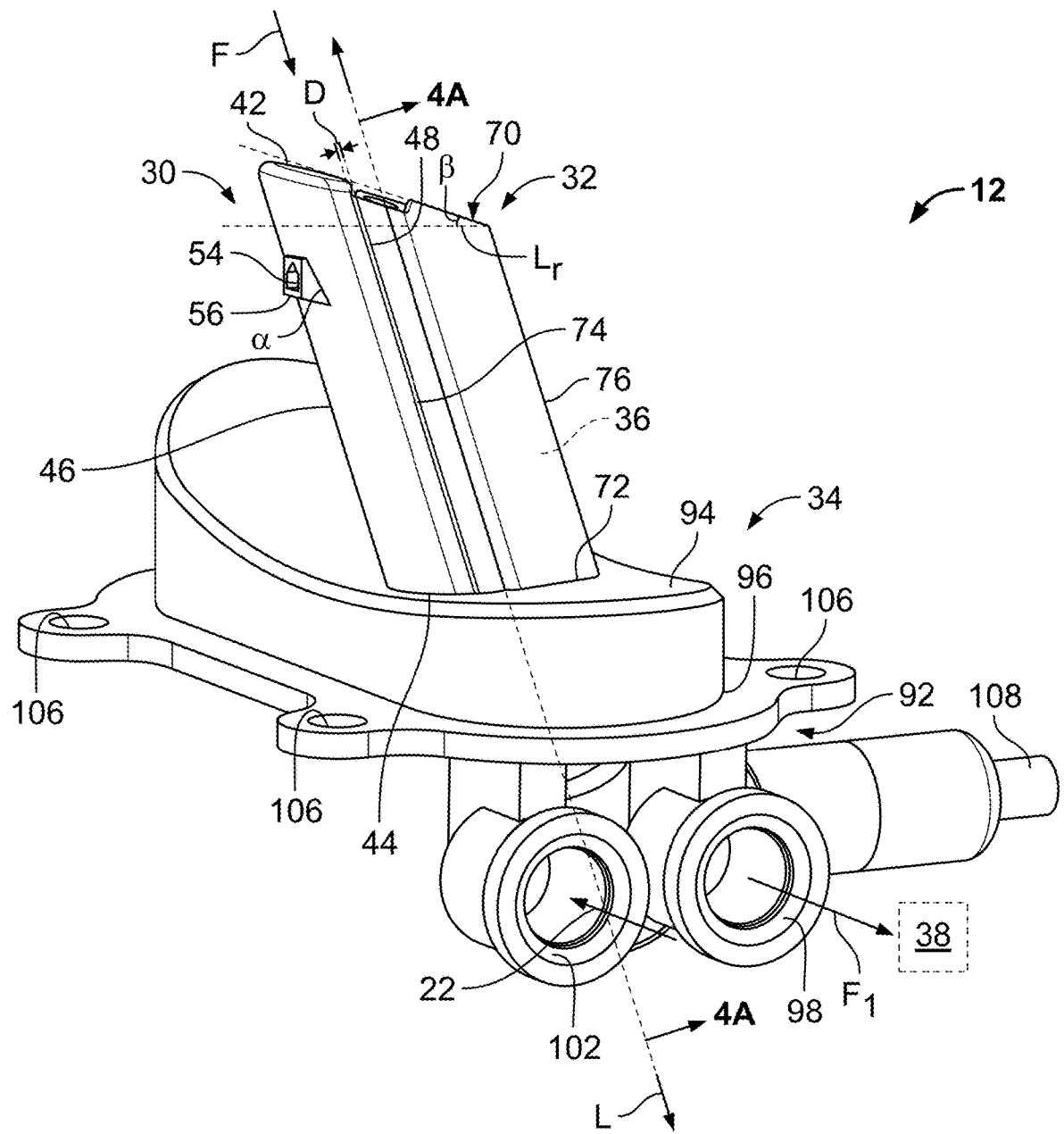
FIG. 2 is a perspective view of the thermally isolated sensor of FIG. 1.

With reference to FIG. 2, a perspective view of the thermally isolated sensor 12 is shown. In one example, the thermally isolated sensor 12 includes a leading projection or leading edge projection 30, a trailing projection or trailing edge projection 32, a base 34, a temperature probe 36 and a pressure sensor 38. The leading edge projection 30, the trailing edge projection 32 and the base 34 are each composed of a metal or metal alloy, including, but not limited to Inconel 718. The leading edge projection 30, the trailing edge projection 32 and the base 34 may be cast, forged, additively manufactured via direct metal laser sintering (DMLS), etc. In addition, while discussed herein as comprising an integral, one-piece or monolithic component, the leading edge projection 30, the trailing edge projection 32 and the base 34 may be discretely formed and coupled together via welding, for example.

Figure 3:
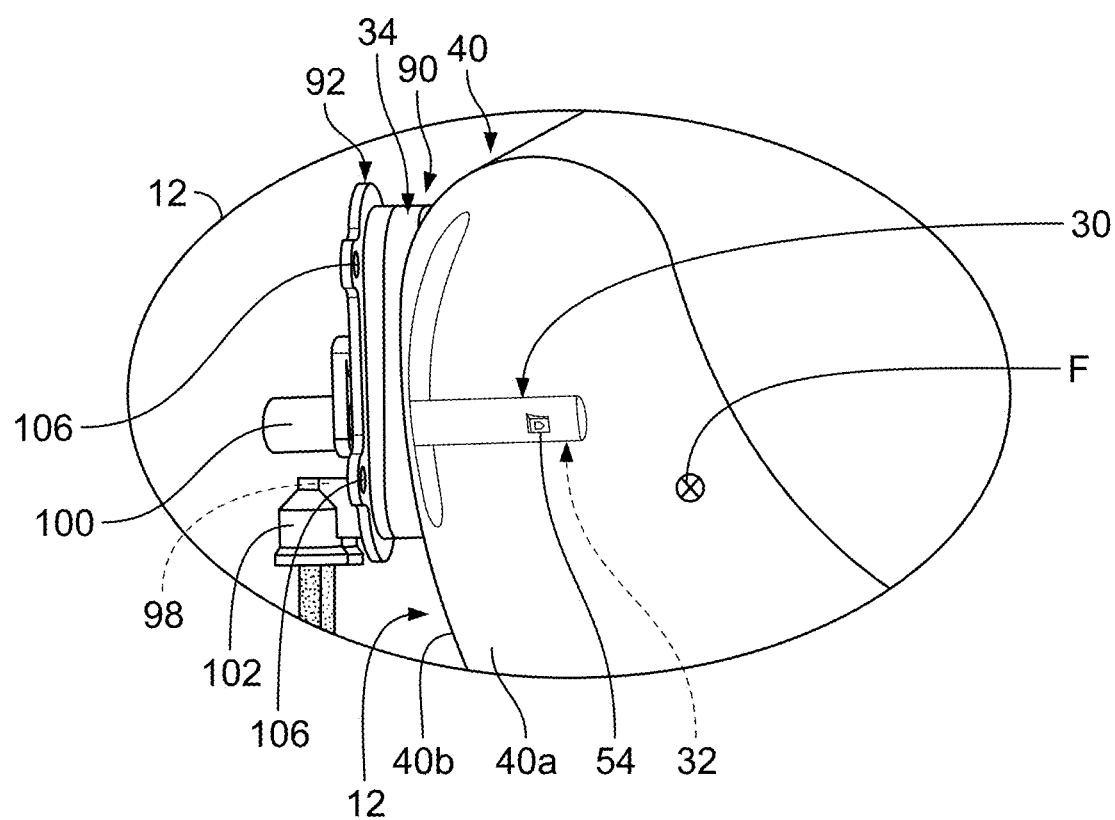
FIG. 3 is a schematic perspective view of the thermally isolated sensor of FIG. 1 coupled to an inlet duct associated with the gas turbine engine of FIG. 1 in accordance with the various teachings of the present disclosure.

The leading edge projection 30 is upstream in a direction of ambient fluid flow F into the gas turbine engine 10, and the trailing edge projection 32 is downstream. With reference to FIG. 3, the thermally isolated sensor 12 is shown coupled to an inlet duct 40 of the gas turbine engine 10. In this example, the thermally isolated sensor 12 is coupled to the inlet duct 40 upstream from a fan (not shown) associated with the intake section of the gas turbine engine 10. As shown, the leading edge projection 30 faces into the ambient fluid flow F or air, which is flowing into the inlet duct 40 (the ambient fluid flow F is directed into the page), and is upstream from the trailing edge projection 32. The base 34 is coupled to the inlet duct 40 via one or more mechanical fasteners, for example. In this example, the base 34 of the thermally isolated sensor 12 is coupled such that the leading edge projection 30 and the trailing edge projection 32 extend into an interior 40a of the inlet duct 40, while the base 34 is coupled to the gas turbine engine 10 so as to face an exterior surface 40b of the inlet duct 40.

With reference back to FIG. 2, the leading edge projection 30 includes a first leading end 42 and an opposite second leading end 44, and a first leading surface 46 opposite a second leading surface 48. The leading edge projection 30 also defines a first hot fluid conduit or first conduit 50 (FIG. 4A) and a second pressure fluid conduit or second conduit 52 (FIG. 4A). The first leading end 42 extends into the ambient fluid flow F (FIG. 3), and is the distalmost end of the thermally isolated sensor 12. The second leading end 44 is coupled to the base 34. The first leading surface 46 faces the ambient fluid flow F (FIG. 3) and defines a pressure inlet 54. Generally, the pressure inlet 54 is centered on the first leading surface 46, and the thermally isolated sensor 12 is coupled to the inlet duct 40 (FIG. 3) so as to be at the location in the inlet duct 40 where the pressure is to be measured. This positioning of the pressure inlet 54 and the thermally isolated sensor 12 improves accuracy of the observations by the pressure sensor 38, and minimizes variations in pressure readings when the thermally isolated sensor 12 is coupled to the gas turbine engine. In this example, the pressure inlet 54 extends at an angle relative to the first leading surface 46 to assist in drawing the ambient fluid flow F (FIG. 3) into the pressure inlet 54. In one example, the pressure inlet 54 is defined through a protrusion 56 that projects outwardly from the first leading surface 46 at an angle $\alpha$. The angle $\alpha$ is about 45 degrees to about 85 degrees. By extending from the first leading surface 46 at the angle $\alpha$, the pressure inlet 54 collects a portion F1 of the ambient fluid flow F (FIG. 3) as it flows into the inlet duct 40 (FIG. 4A). In addition, by extending at the angle $\alpha$, the spanwise flow along the first leading end 42 of the thermally isolated sensor 12 is minimized, which in turn, minimizes water flowing over the leading edge projection 30 of the thermally isolated sensor 12 and into the pressure inlet 54. The portion F1 of the ambient fluid flow F collected by the pressure inlet 54 flows through the first conduit 50 to the pressure sensor 38, as will be discussed. The second leading surface 48 is spaced apart from and thermally isolated from the trailing edge projection 32.

Figure 4:
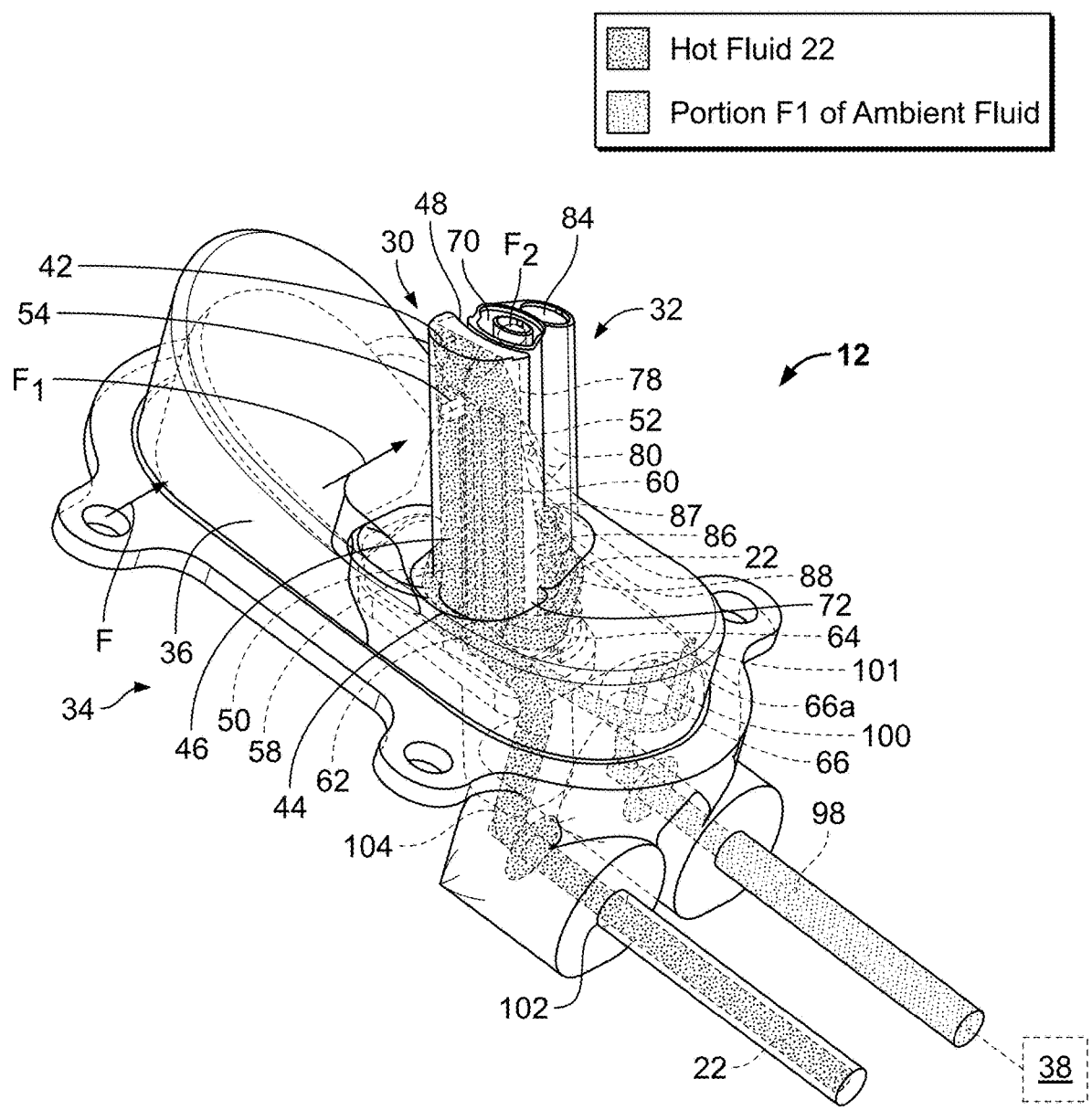
FIG. 4 is a schematic perspective illustration of a flow of fluids through the thermally isolated sensor of FIG. 1.
Figure 4A:
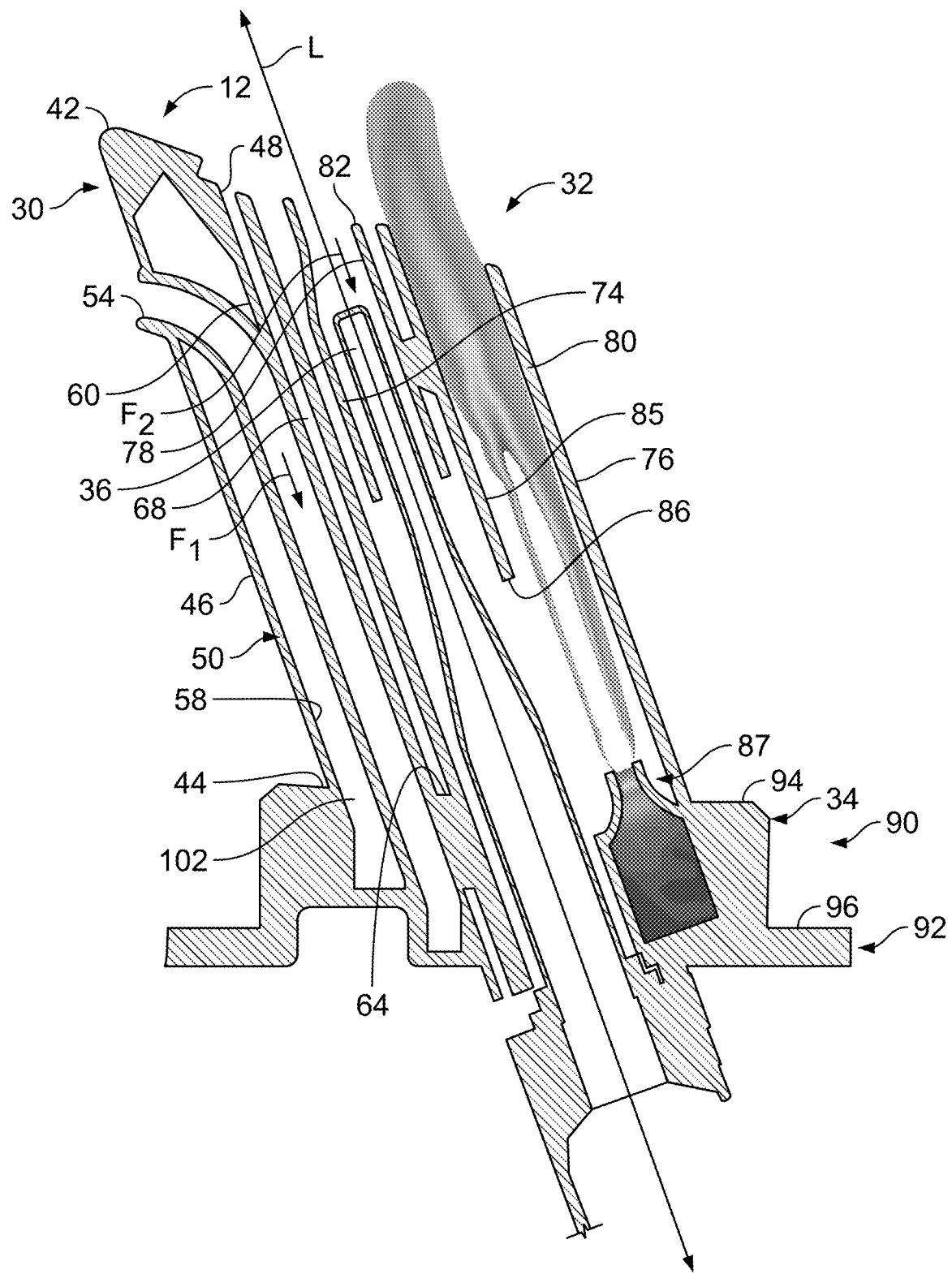
FIG. 4A is a cross-sectional view of the thermally isolated sensor of FIG. 1, taken along line 4A-4A of FIG. 2.
Figure 4B:
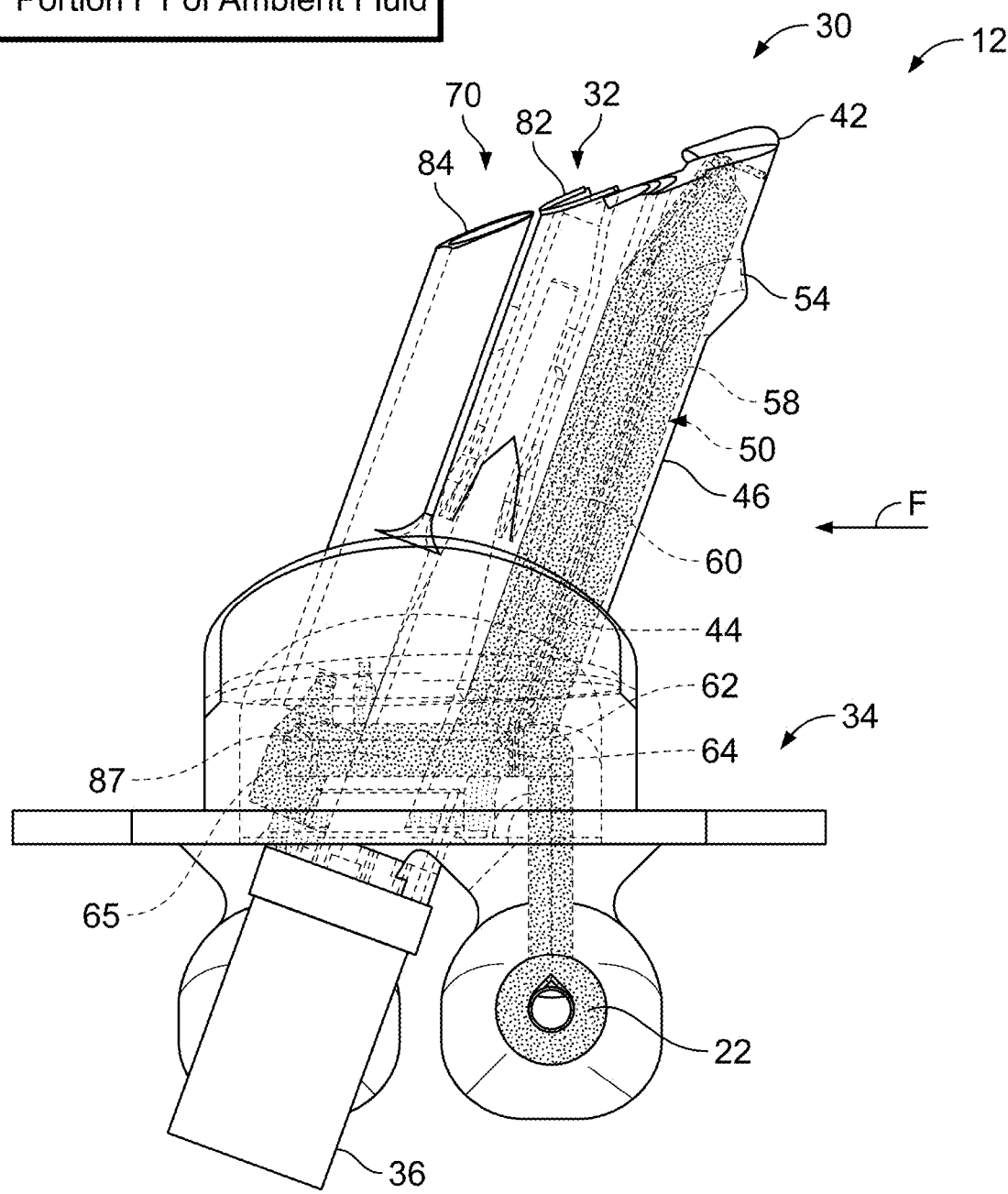
FIG. 4B is a schematic side illustration of the flow of fluids through the thermally isolated sensor of FIG. 1.
Figure 4C:
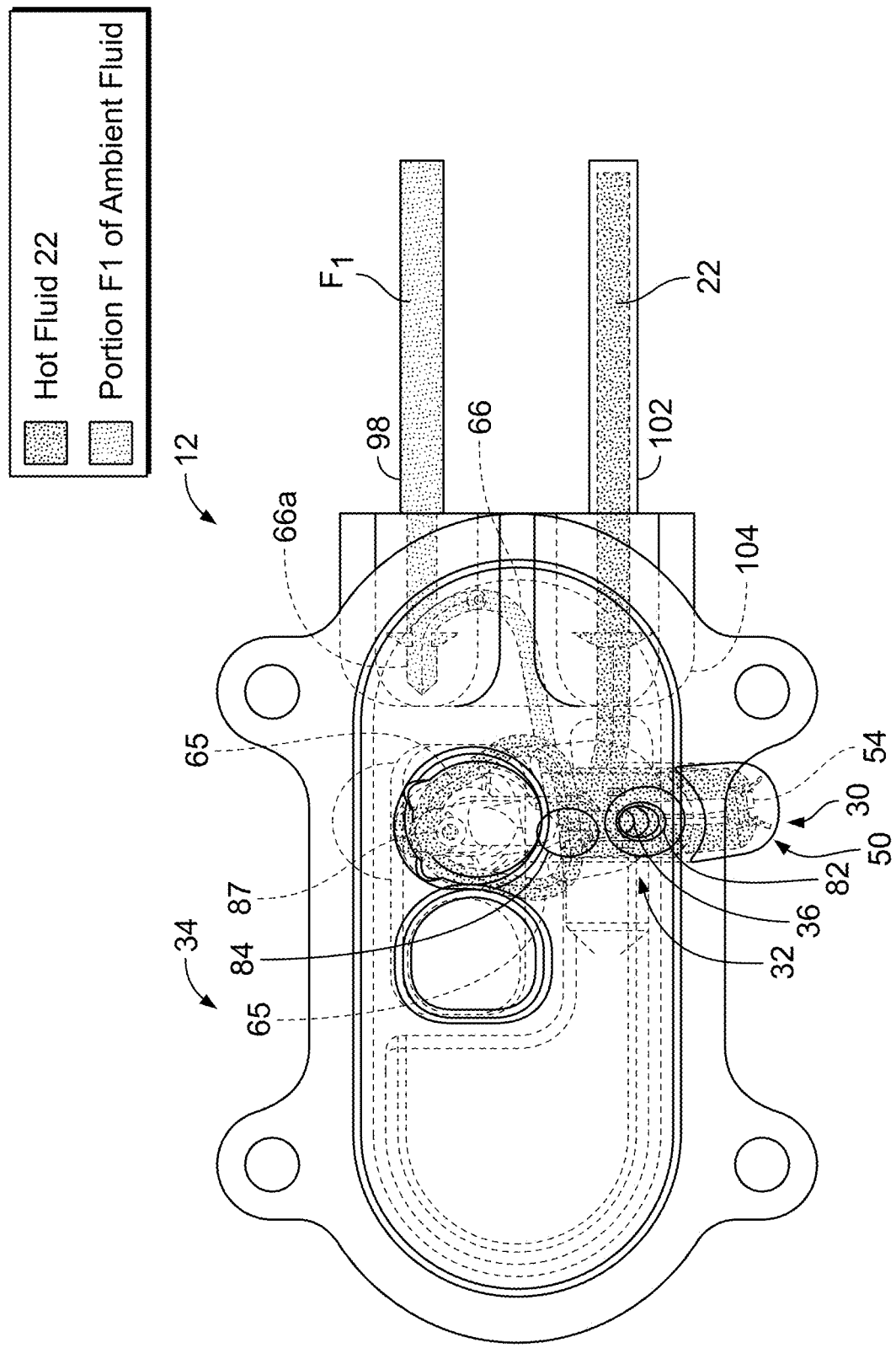
FIG. 4C is a schematic top illustration of the flow of fluids through the thermally isolated sensor of FIG. 1.

With reference to FIG. 4, the first conduit 50 is fluidly coupled to the hot fluid source 16 (FIG. 1) to receive the hot fluid 22. The first conduit 50 is coupled to the hot fluid source 16 via one or more conduits and couplings, for example. With reference to FIG. 4A, the first conduit 50 is defined through the leading edge projection 30 from the second leading end 44 to the first leading end 42, and in one example, includes a first branch 58 and a second branch 60. With additional reference to FIG. 4B, the first branch 58 is defined along the first leading surface 46 and extends along the first leading surface 46 from the second leading end 44 to the first leading end 42. The first conduit 50 has an inlet 62 defined at the base 34 in fluid communication with the first branch 58 and the hot fluid source 16 (FIG. 1). The first branch 58 is defined along and proximate the first leading surface 46 to enable the hot fluid 22 to warm or raise the temperature of the first leading surface 46, which reduces the formation of ice or ice particles along the first leading surface 46. At the first leading end 42, the first branch 58 transitions to the second branch 60. The second branch 60 extends from the first leading end 42 to the second leading end 44. The second branch 60 is defined along and proximate the second leading surface 48. At the second leading end 44, the second branch 60 is fluidly coupled to the base 34, which directs the hot fluid 22 from the second branch 60 through the base 34 to the trailing edge projection 32, as will be discussed. The first conduit 50 has an outlet 64 defined at the base 34, which is in fluid communication with the second branch 60 to direct the hot fluid 22 from the leading edge projection 30 into the trailing edge projection 32 through the base 34. Thus, the hot fluid 22 enters the leading edge projection 30 at the inlet 62, flows through the first branch 58, enters the second branch 60 at the first leading end 42, and flows through the second branch 60 to the outlet 64. From the outlet 64, the hot fluid 22 flows through a pair of conduits 65 (FIG. 4C) defined in the base 34 to an ejector nozzle 87 associated with the trailing edge projection 32 (FIG. 4C).

With reference back to FIG. 4, the second conduit 52 is defined through the leading edge projection 30 from the pressure inlet 54 to the base 34. The second conduit 52 directs the portion F1 of the ambient fluid flow F received through the pressure inlet 54 through the leading edge projection 30 to the base 34. At the base 34, with reference back to FIG. 4, the second conduit 52 is fluidly coupled to a third pressure conduit or third conduit 66. The third conduit 66 is fluidly coupled to the pressure sensor 38 to provide the pressure sensor 38 with the portion F1 of the ambient fluid flow F received through the pressure inlet 54.

The trailing edge projection 32 is spaced apart from and uncoupled from the leading edge projection 30. Generally, with reference to FIG. 4A, a gap 68 is defined between the leading edge projection 30 and the trailing edge projection 32, and the leading edge projection 30 and the trailing edge projection 32 are coupled to the base 34 and not to each other. The gap 68 enables air to flow between the leading edge projection 30 and the trailing edge projection 32, which further thermally isolates the leading edge projection 30 from the trailing edge projection 32. By being spaced apart from and uncoupled from the leading edge projection 30, the trailing edge projection 32 is substantially thermally isolated from the leading edge projection 30. The thermal isolation of the trailing edge projection 32 improves the accuracy of the temperature probe 36, as the ambient fluid flow F entering the temperature probe 36 is not inadvertently heated by the hot fluid 22 that flows through the leading edge projection 30.

With reference back to FIG. 2, the trailing edge projection 32 includes a first trailing end 70 and an opposite second trailing end 72, and a first trailing surface 74 opposite a second trailing surface 76. The trailing edge projection 32 also defines a fourth inlet fluid conduit or fourth conduit 78 (FIG. 4) and an ejector conduit or fifth conduit 80 (FIG. 4). The first trailing end 70 extends into the ambient fluid flow F (FIG. 3), but extends for a distance less than the first leading end 42. In this example, the first leading end 42 and the first trailing end 70 are scarfed backwards, such that the first leading end 42 and the first trailing end 70 each extend along an angle $\beta$ relative to the trailing edge projection 32. In one example, the angle $\beta$ is defined between the first leading end 42 and the first trailing end 70 and a reference line Lr defined normal to a longitudinal axis L of the thermally isolated sensor 12 that extends parallel to both the leading edge projection 30 and the trailing edge projection 32. Generally, a direction of the airflow upstream of the thermally isolated sensor 12 is parallel to the reference line Lr, a first, top base surface 94 of the base 34 and the first trailing surface 74. The angle β may also be defined as the angle between the first trailing end 70 and the airflow direction. Thus, the first leading end 42 and the first trailing end 70 generally extend at an angle relative to the longitudinal axis L of the thermally isolated sensor 12. Stated another way, the first leading end 42 and the first trailing end 70 extend along an axis that is transverse or oblique to the longitudinal axis L. By having the leading edge projection 30 and the trailing edge projection 32 scarfed or extending at the angle β, the ambient fluid flow F is forced to turn to enter into the fourth conduit 78 as shown in FIG. 4. Due to the inertia of water droplets or ice particles, the water droplets or ice particles are unable to make the turn into a trailing inlet 82 associated with the fourth conduit 78. Stated another way, the shape of the scarf or the angle β is such that the first leading end 42 is above the first trailing end 70, which causes the water droplets or ice particles to flow past and not into the trailing inlet 82 as the water droplets or ice particles cannot make the turn into the trailing inlet 82. The first leading end 42 shields the trailing inlet 82 of the first trailing end 70 from water droplets or ice particles. Thus, the scarf or the angle β of the first leading end 42 and the first trailing end 70 inhibits ice from forming on the temperature probe 36 when the thermally isolated sensor 12 is operating in temperatures below freezing and also inhibits water or ice from contacting the temperature probe 36.

Figure 5:
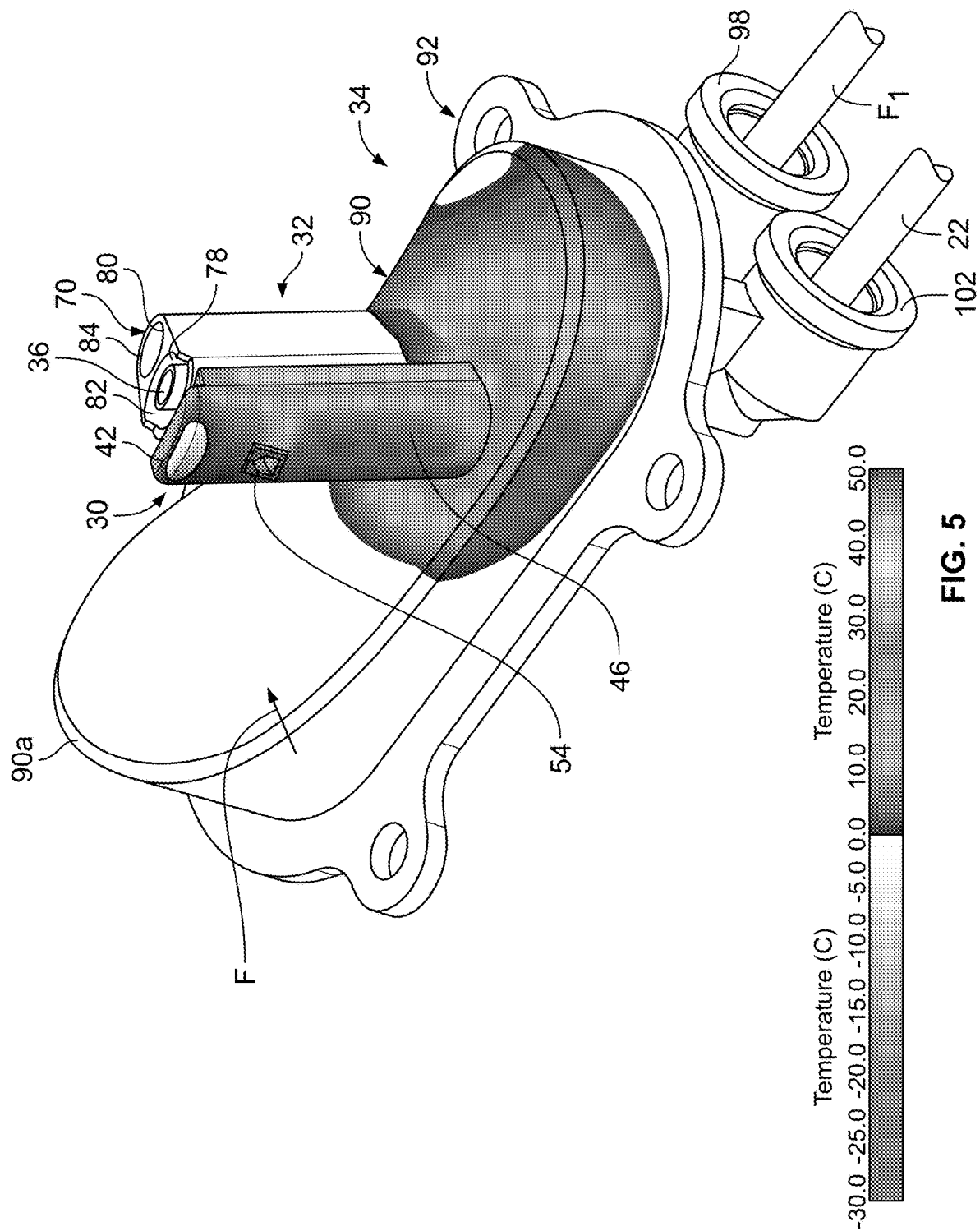
FIG. 5 is a perspective view of the thermally isolated sensor of FIG. 1, which is shaded to illustrate an exemplary heating of the thermally isolated sensor by a hot fluid to inhibit ice formation without impacting an accuracy of a temperature probe associated with the thermally isolated sensor.

With reference to FIG. 5, the first trailing end 70 includes the trailing inlet 82 and an ejector outlet 84. The trailing inlet 82 is defined about the temperature probe 36 and receives a portion F2 (FIG. 4) of the ambient fluid flow F. The trailing inlet 82 is fluidly coupled to the fourth conduit 78. The portion F2 (FIG. 4) of the ambient fluid flow F that enters into the trailing inlet 82 is directed through the fourth conduit 78 and past the temperature probe 36. The ejector outlet 84 is defined downstream from the trailing inlet 82. The ejector outlet 84 exhausts the hot fluid 22 and the portion F2 (FIG. 4) of the ambient fluid flow F out of the thermally isolated sensor 12. The ejector outlet 84 is in fluid communication with the fifth conduit 80 to receive the hot fluid 22 and the portion F2 (FIG. 4) of the ambient fluid flow F. With reference back to FIG. 2, the second trailing end 72 is coupled to the base 34. The first trailing surface 74 faces the second leading surface 48 and is spaced a distance D apart from the second leading surface 48. The second trailing surface 76 is downstream of the first trailing surface 74.

With reference to FIG. 4, the fourth conduit 78 is fluidly coupled to the trailing inlet 82 to receive the portion F2 of the ambient fluid flow F. With reference to FIG. 4A, the fourth conduit 78 is defined through the trailing edge projection 32 from the first trailing end 70 toward the second trailing end 72. In one example, the temperature probe 36 is disposed in the fourth conduit 78. Downstream from the temperature probe 36, the fourth conduit 78 includes an outlet 86 in fluid communication with the fifth conduit 80. The outlet 86 is defined through a wall 85 that partially defines the fifth conduit 80. The fifth conduit 80 is defined from the second trailing end 72 to the ejector outlet 84 at the first trailing end 70. With reference to FIG. 4, the fifth conduit 80 is in fluid communication with the pair of conduits 65 defined in the base 34 to receive the hot fluid 22 from the leading edge projection 30. Thus, the fifth conduit 80 is in fluid communication with the fourth conduit 78 to receive the portion F2 of the ambient fluid flow F and is in fluid communication with the pair of conduits 65 to receive the hot fluid 22. The hot fluid 22 mixes with the portion F2 of the ambient fluid flow F before exiting the fifth conduit 80 through the ejector outlet 84. Thus, the portion F2 of the ambient fluid flow F enters the trailing edge projection 32 at the trailing inlet 82, flows through the fourth conduit 78, and flows through the fourth conduit 78 to the fifth conduit 80 and exits the ejector outlet 84.

In one example, with reference back to FIG. 4, the fifth conduit 80 is in communication with the ejector nozzle 87. In this example, the ejector nozzle 87 is defined within the base 34 and extends into the fifth conduit 80. In one example, the ejector nozzle 87 is integrally formed with the trailing edge projection 32 and the base 34, and is in communication with and adjacent to the outlet 86 defined between the fourth conduit 78 and the fifth conduit 80. The ejector nozzle 87 extends along an axis generally parallel to the longitudinal axis L of the thermally isolated sensor 12. The ejector nozzle 87 is fluidly coupled to the pair of conduits 65 (FIG. 4) to receive the hot fluid 22 from the first conduit 50. The ejector nozzle 87 accelerates the hot fluid 22, which in turn, draws the portion F2 of the ambient fluid flow F (which has a lower pressure than the hot fluid 22) into the trailing inlet 82 and past the temperature probe 36. Thus, the ejector nozzle 87 ensures that the portion F2 of the ambient fluid flow F moves past the temperature probe 36.

With reference back to FIG. 2, the base 34 is coupled to the leading edge projection 30 and the trailing edge projection 32. The base 34 includes a body 90 and a mounting flange 92. The body 90 includes the first, top base surface 94, a second, bottom base surface 96, a pressure outlet conduit 98, a drain outlet 100, a heated fluid inlet conduit 102 and defines the pair of conduits 65, the third conduit 66 and a sixth conduit 104 between the top base surface 94 and the bottom base surface 96. The top base surface 94 is smooth, and in one example, is contoured to conform with a surface of the interior 40a of the inlet duct 40 (FIG. 3) of the gas turbine engine 10 (FIG. 30. The bottom base surface 96 is substantially planar, and is coupled to or integrally formed with the mounting flange 92. With reference to FIG. 4, the pressure outlet conduit 98 receives the portion F1 of the ambient fluid flow F from the third conduit 66, and directs the portion F1 of the ambient fluid flow F to the pressure sensor 38.

With reference back to FIG. 4, the pressure outlet conduit 98 is fluidly coupled to the third conduit 66 to receive the portion F1 of the ambient fluid flow F. The pressure outlet conduit 98 is coupled to a suitable fluid conduit or pressure line, which in turn, is fluidly coupled to the pressure sensor 38 to direct the portion F1 of the ambient fluid flow F to the pressure sensor 38. Generally, the pressure outlet conduit 98 is fluidly coupled to the pressure sensor 38 via any suitable technique. The drain outlet 100 is defined through the body 90 of the base 34 to direct fluid entrained with water droplets from the portion F1 of the ambient fluid flow F within the third conduit 66 out through a drain hole 101 defined through the base 34. In certain instances, the drain outlet 100 may also include a gasket for coupling to the drain hole 101. The drain outlet 100 receives the fluid entrained with water droplets from the third conduit 66. In this regard, the third conduit 66 is coupled to the pressure outlet conduit 98 with a turn 66a, while the drain outlet 100 is fluidly coupled to the third conduit 66 at less of an angle or with a banked curve. The fluid entrained with water droplets or ice particles has a larger inertia, and is unable to turn into the pressure outlet conduit 98. Thus, the fluid with the entrained water droplets or ice particles follows the turn into the drain outlet 100. This ensures that the pressure sensor 38 is not contacted by water droplets or ice particles, and thereby ensures an accuracy of the pressure sensor 38.

With reference back to FIG. 2, the heated fluid inlet conduit 102 is a hollow cylindrical tube, which is coupled to a suitable fluid conduit, such as a hose, duct, etc., via a clamp, quick disconnect coupling, etc. to direct the heated fluid from the hot fluid source 16 (FIG. 1) into the thermally isolated sensor 12. Thus, generally, the heated fluid inlet conduit 102 is fluidly coupled to the hot fluid source 16 (FIG. 1) via any suitable technique. With reference to FIG. 4, the heated fluid inlet conduit 102 is fluidly coupled to the sixth conduit 104 defined within the body 90, which directs the hot fluid 22 from the heated fluid inlet conduit 102 to the first branch 58 of the first conduit 50 of the leading edge projection 30.

With reference to FIG. 4C, the pair of conduits 65 are defined within the body 90 and fluidly couple the first conduit 50 to the ejector nozzle 87. In this example, the conduits 65 are defined through the body 90 such that a first one of the conduits 65 is defined to extend about a portion of one side of the fourth conduit 78, and the other of the conduits 65 is defined to extend about a portion of the other opposite side of the fourth conduit 78 such that the hot fluid 22 is spaced a distance apart from the temperature probe 36 as the hot fluid 22 flows from the first conduit 50 to the ejector nozzle 87. The spacing the pair of conduits 65 apart from the fourth conduit 78, and thus, the temperature probe 36, inhibits an inadvertent heating of the temperature probe 36. The third conduit 66 is defined within the body 90 and fluidly couples the second conduit 52 of the leading edge projection 30 to the pressure outlet conduit 98 and to the drain outlet 100. The sixth conduit 104 is defined within the body 90 and fluidly couples the heated fluid inlet conduit 102 to the first branch 58 of the leading edge projection 30.

With reference back to FIG. 2, the mounting flange 92 is defined about a perimeter of the bottom base surface 96. The mounting flange 92 includes at least one or a plurality of mounting bores 106. Each of the mounting bores 106 receive a suitable mechanical fastener, such as a bolt, screw, etc. to mechanically couple the thermally isolated sensor 12 to the gas turbine engine 10. For ease of illustration, the mounting structure of the gas turbine engine 10 that couples to the mounting bores 106 is not shown in FIG. 3. It should be noted that the configuration of the mounting flange 92 is merely an example, and the mounting flange 92 may have any desired configuration of mounting bores 106 for a particular gas turbine engine 10. Moreover, the thermally isolated sensor 12 may be coupled to the gas turbine engine 10 through other techniques, such as welding, for example.

With reference to FIG. 4A, the temperature probe 36 is any suitable total air temperature probe that observes a total air temperature of the portion F2 of the ambient fluid flow F received through the trailing inlet 82. In one example, the temperature probe 36 generates an electrical signal that varies based on the temperature of the portion F2 of the ambient fluid flow F. The electrical signal is communicated to the controller 14 (FIG. 1) over a suitable communication architecture, including, but not limited to a bus. In this example, the temperature probe 36 is positioned within the fourth conduit 78, and extends from proximate the trailing inlet 82 through the base 34. The temperature probe 36 is thermally isolated from the leading edge projection 30. The temperature probe 36 may include an electrical connector 108 (FIG. 2), which extends beyond the bottom base surface 96 for electrically coupling the temperature probe 36 to the controller 14 (FIG. 1).

With reference back to FIG. 2, the pressure sensor 38 is any suitable pressure sensor that observes a total pressure of the portion F1 of the ambient fluid flow F received through the pressure inlet 54. In one example, the portion F1 of the ambient fluid flow F is directed from the pressure inlet 54 through the pressure outlet conduit 98 to a connecting pressure line, which directs the portion F1 of the ambient fluid flow F to the pressure sensor 38. In one example, the pressure sensor 38 may be located within the controller 14 (FIG. 1) associated with the gas turbine engine 10, and may generate an electrical signal that varies based on the pressure of the portion F1 of the ambient fluid flow F. In this example, the pressure sensor 38 is fluidly coupled to the pressure outlet conduit 98 via the connecting pressure line to receive the portion F1 of the ambient fluid flow F received through the pressure inlet 54. It should be noted that in certain embodiments, the pressure sensor 38 may be configured differently, and may be coupled to the thermally isolated sensor 12 and in communication with the controller 14 over a suitable communication medium, such as a bus.

In one example, the thermally isolated sensor 12 is integrally formed, via additive manufacturing, as discussed, and the temperature probe 36 is positioned within the fourth conduit 78. The pressure sensor 38 is fluidly coupled to the pressure outlet conduit 98. With reference to FIG. 3, the thermally isolated sensor 12 is installed on the inlet duct 40 such that the leading edge projection 30 extends into the ambient fluid flow F, and the pressure inlet 54 is near a center line of the inlet duct 40. One or more fasteners, such as bolts, screws, etc. are received within the mounting bores 106 of the mounting flange 92 to couple the thermally isolated sensor 12 to the gas turbine engine 10 (the mounting structure of the gas turbine engine 10 is not shown herein for clarity). The heated fluid inlet conduit 102 is coupled to the hot fluid source 16 (FIG. 1). The temperature probe 36 is placed in communication with the controller 14 (FIG. 1), while the pressure sensor 38, in this example, is disposed within the controller 14 (FIG. 1).

With the thermally isolated sensor 12 coupled to the gas turbine engine 10, as the gas turbine engine 10 operates, the thermally isolated sensor 12 is exposed to the ambient fluid flow F. With reference to FIG. 4, the hot fluid 22 from the hot fluid source 16 (FIG. 1) is directed through the heated fluid inlet conduit 102, through the sixth conduit 104 and along the first leading surface 46 via the first branch 58. With reference to FIG. 5, the hot fluid 22 raises the temperature of the first leading surface 46 about forty to sixty degrees Celsius compared to a distal end 90a of the body 90 that is spaced apart from the leading edge projection 30. As the hot fluid 22 raises the temperature of the leading edge projection 30, the hot fluid 22 inhibits the formation of ice or ice particles along the leading edge projection 30. From the first branch 58, with reference to FIG. 4C, the hot fluid 22 flows through the second branch 60 to the pair of conduits 65. From the pair of conduits 65, the hot fluid 22 flows into the ejector nozzle 87. From the ejector nozzle 87, the hot fluid 22 mixes with the portion F2 of the ambient fluid flow F received through the fourth conduit 78 prior to exiting through the ejector outlet 84. With reference back to FIG. 5, the hot fluid 22 heats the leading edge projection 30, thereby inhibiting ice or ice particle formation, while not heating the temperature probe 36. In this regard, as shown, the temperature probe 36 remains at substantially the same temperature as the ambient air flow F. As shown, the temperature probe 36 is also substantially the same temperature as the distal end 90a of the body 90. By thermally isolating the temperature probe 36 from the hot fluid 22 and the leading edge projection 30, the temperature readings or observations of the temperature probe 36 have increased accuracy. In this example, the accuracy of the temperature probe 36 is within about 1 degree to about 2 degrees Celsius.

As the gas turbine engine 10 operates, the portion F2 of the ambient fluid flow F is received into the trailing inlet 82. From the trailing inlet 82, the portion F2 of the ambient fluid flow F flows through the fourth conduit 78 about the temperature probe 36, and through the outlet 86 into the fifth conduit 80. The temperature probe 36 observes the total air temperature of the portion F2 of the ambient fluid flow F, and generates sensor signals that are transmitted or communicated to the controller 14 (FIG. 1).

Also, with reference back to FIG. 4, as the gas turbine engine 10 operates, the portion F1 of the ambient fluid flow F is received into the pressure inlet 54. From the pressure inlet 54, the portion F1 of the ambient fluid flow F is directed through the second conduit 52 and through the third conduit 66. The portion F1 of the ambient fluid flow F that is devoid of water or water droplets flows into the pressure outlet conduit 98, which is fluidly coupled to the pressure sensor 38. The pressure sensor 38 observes the total pressure of the portion F1 of the ambient fluid flow F, and generates sensor signals based thereon (FIG. 1). The portion F1 of the ambient fluid flow F that is entrained with water or water droplets flows from the third conduit 66 into the drain outlet 100 and exits the drain hole 101.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A thermally isolated sensor associated with a gas turbine engine, comprising:
    a sensor probe configured to measure a temperature of an ambient fluid;
    a base to be coupled to the gas turbine engine;
    a leading projection coupled to the base that extends into the ambient fluid, the leading projection includes a first conduit fluidly coupled to a heat source associated with the gas turbine engine, the leading projection includes a second inlet configured to receive the ambient fluid, the second inlet is fluidly coupled to a second sensor configured to measure a pressure of the ambient fluid, the second inlet is fluidly coupled to a second conduit defined in the leading projection, the second conduit is fluidly coupled to the second sensor and is fluidly coupled to a third conduit, the third conduit is fluidly coupled to a drain outlet, and the drain outlet is defined through the base to direct the ambient fluid with entrained droplets or particles away from the second sensor; and
    a trailing projection coupled to the base that extends into the ambient fluid, the trailing projection downstream from the leading projection and spaced apart from the leading projection to define a gap between the leading projection and the trailing projection, the trailing projection including an inlet configured to receive the ambient fluid, with the sensor probe disposed within the inlet and thermally isolated from the leading projection by the gap.

2. The thermally isolated sensor of claim 1, wherein the ambient fluid is air, and the leading projection and the trailing projection are scarfed at an angle such that the leading end of the leading projection extends beyond the trailing end of the trailing projection to inhibit the entrained droplets or particles in the ambient fluid from entering the inlet of the trailing projection.

3. The thermally isolated sensor of claim 1, wherein the heat source associated with the gas turbine engine is bleed air from a compressor section associated with the gas turbine engine.

4. The thermally isolated sensor of claim 1, wherein the trailing projection defines a fourth conduit fluidly coupled to the inlet, and the fourth conduit surrounds the sensor probe.

5. The thermally isolated sensor of claim 4, wherein the trailing projection defines a fifth conduit fluidly coupled to the fourth conduit to receive the ambient fluid and fluidly coupled to the leading projection.

6. The thermally isolated sensor of claim 5, wherein the fifth conduit includes an ejector nozzle, and defines an ejector outlet to exhaust the ambient fluid out of the thermally isolated sensor.

7. A thermally isolated sensor associated with a gas turbine engine, comprising:
    a sensor probe configured to measure a temperature of an ambient fluid;
    a base to be coupled to the gas turbine engine;
    a leading projection coupled to the base that extends into the ambient fluid, the leading projection including a first conduit configured to receive a hot fluid associated with the gas turbine engine; and
    a trailing projection coupled to the base that extends into the ambient fluid, the trailing projection downstream from the leading projection and spaced apart from the leading projection to define a gap between the leading projection and the trailing projection, the trailing projection including an inlet and an ejector conduit, the inlet configured to receive the ambient fluid, with the sensor probe disposed within the inlet and thermally isolated from the leading projection by the gap, the ejector conduit fluidly coupled to the first conduit and the inlet downstream from the sensor probe, the ejector conduit configured to exhaust the hot fluid and the ambient fluid from the thermally isolated sensor, and a leading end of the leading projection extends beyond a trailing end of the trailing projection to inhibit droplets or particles entrained in the ambient fluid from entering the inlet of the trailing projection.

8. The thermally isolated sensor of claim 7, wherein the ambient fluid is air, and the leading end of the leading projection and the trailing end of the trailing projection extend at an angle relative to a longitudinal axis of the thermally isolated sensor.

9. The thermally isolated sensor of claim 7, wherein the leading projection includes a second inlet configured to receive the ambient fluid, and the second inlet is fluidly coupled to a second sensor configured to measure a pressure of the ambient fluid.

10. The thermally isolated sensor of claim 9, wherein the second inlet is fluidly coupled to a second conduit defined in the leading projection, the second conduit is fluidly coupled to the second sensor and is fluidly coupled to a third conduit, the third conduit is fluidly coupled to a drain outlet, and the drain outlet is defined through the base to direct the ambient fluid with the entrained droplets or particles away from the second sensor.

11. The thermally isolated sensor of claim 7, wherein the hot fluid is bleed air from a compressor section associated with the gas turbine engine.

12. The thermally isolated sensor of claim 10, wherein the trailing projection defines a fourth conduit fluidly coupled to the inlet, and the fourth conduit surrounds the sensor probe.

13. The thermally isolated sensor of claim 12, wherein the ejector conduit is fluidly coupled to the fourth conduit to receive the ambient fluid and fluidly coupled to the first conduit to receive the hot fluid.

14. The thermally isolated sensor of claim 13, wherein the ejector conduit includes an ejector nozzle configured to receive the hot fluid from the first conduit.

15. A gas turbine engine, comprising:
a hot fluid source configured to supply a hot fluid;
a thermally isolated sensor configured to measure a temperature and a pressure of an ambient fluid surrounding the gas turbine engine, the thermally isolated sensor including:
a temperature probe;
a pressure inlet configured to direct a portion of the ambient fluid to a pressure sensor;
a base coupled to the gas turbine engine;
a leading projection coupled to the base that extends into the ambient fluid, the leading projection including a first conduit configured to receive the hot fluid and a second conduit, the second conduit fluidly coupled to the pressure inlet to receive the ambient fluid and to the pressure sensor; and
a trailing projection coupled to the base that extends into the ambient fluid, the trailing projection downstream from the leading projection, the trailing projection including an inlet configured to receive the ambient fluid, a conduit fluidly coupled to the inlet and an ejector conduit, with the temperature probe disposed within the inlet and surrounded by the conduit, the temperature probe thermally isolated from the leading projection, the ejector conduit fluidly coupled to the first conduit and to the conduit, and the ejector conduit is configured to exhaust the hot fluid and the ambient fluid from the thermally isolated sensor.

16. The gas turbine engine of claim 15, wherein the ambient fluid is air, and a leading end of the leading projection and a trailing end of the trailing projection extend at an angle relative to a longitudinal axis of the thermally isolated sensor such that the leading end of the leading projection extends beyond the trailing end of the trailing projection to inhibit droplets or particles entrained in the fluid from entering the inlet of the trailing projection.

* * * * *